H. P. MARTIN.
WORK STAND.
APPLICATION FILED MAY 11, 1914.

1,126,544.

Patented Jan. 26, 1915.

2 SHEETS—SHEET 1.

Witnesses

Inventor
Henry P. Martin,
By Mason Fenwick Lawrence,
Attorneys

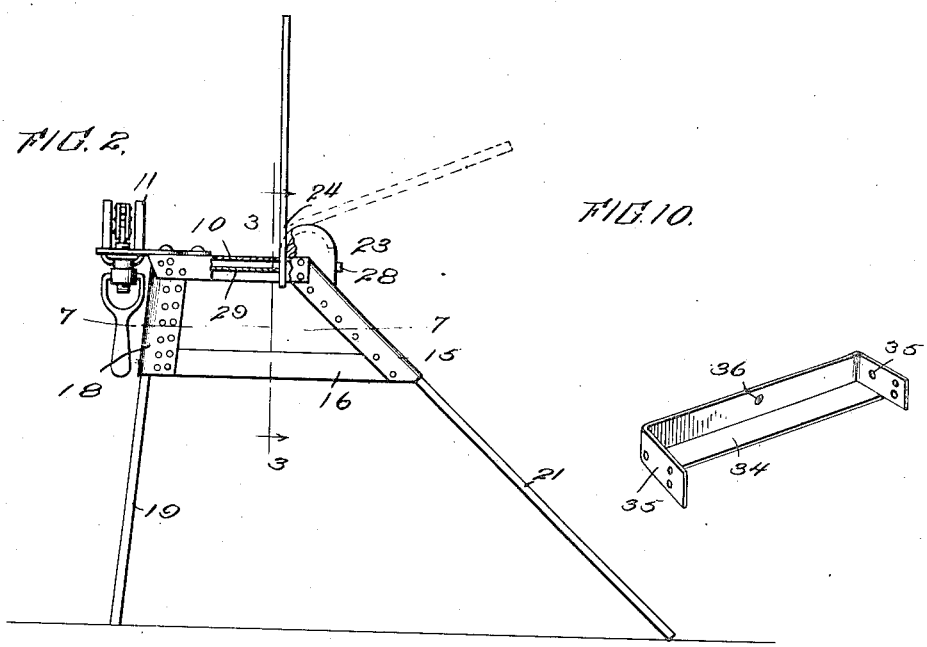
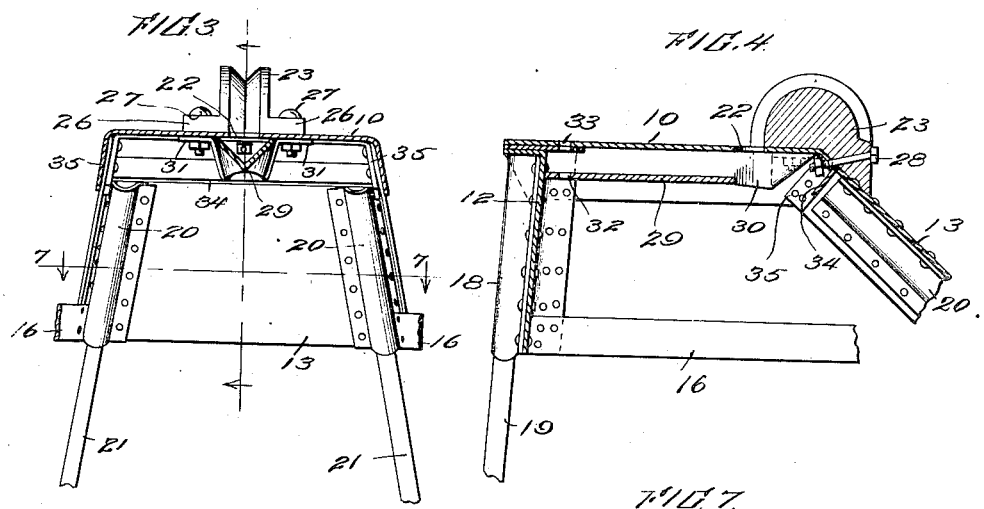
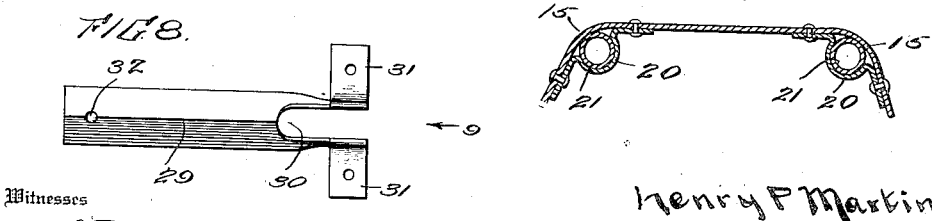

UNITED STATES PATENT OFFICE.

HENRY PHILLIP MARTIN, OF OWENSBORO, KENTUCKY, ASSIGNOR TO CLARENCE FRANK MARTIN, OF OWENSBORO, KENTUCKY.

WORK-STAND.

1,126,544.

Specification of Letters Patent.

Patented Jan. 26, 1915.

Application filed May 11, 1914. Serial No. 837,908.

*To all whom it may concern:*

Be it known that I, HENRY PHILLIP MARTIN, a citizen of the United States, residing at Owensboro, in the county of Daviess and State of Kentucky, have invented certain new and useful Improvements in Work-Stands; and I do hereby declare the following to be a full, clear, and exact description of the invention, such as will enable others skilled in the art to which it appertains to make and use the same.

This invention relates to work stands and especially to work stands for use of electricians, plumbers and the like in handling, bending and otherwise manipulating pipes.

The principal object of this invention is to produce a stand of this character, not only having its legs removable so that it can be stored or transported with ease, but having all parts thoroughly braced so as to permit the bending of pipes and rods without injury to the stand or tipping it over.

A specific object of the invention may, therefore, be said to be the provision of means for bracing the stand and for permitting the insertion of the end of the tube or rod to be bent.

Another object of the invention is to so dispose the mandrel that it serves to assist in the bending of the object, for holding an object when the same is clamped in the vise, and for holding the legs when they are detached.

With these and other objects in view the invention comprises certain novel constructions, combinations and arrangement of parts as will be hereinafter more fully described and claimed.

Figure 1:
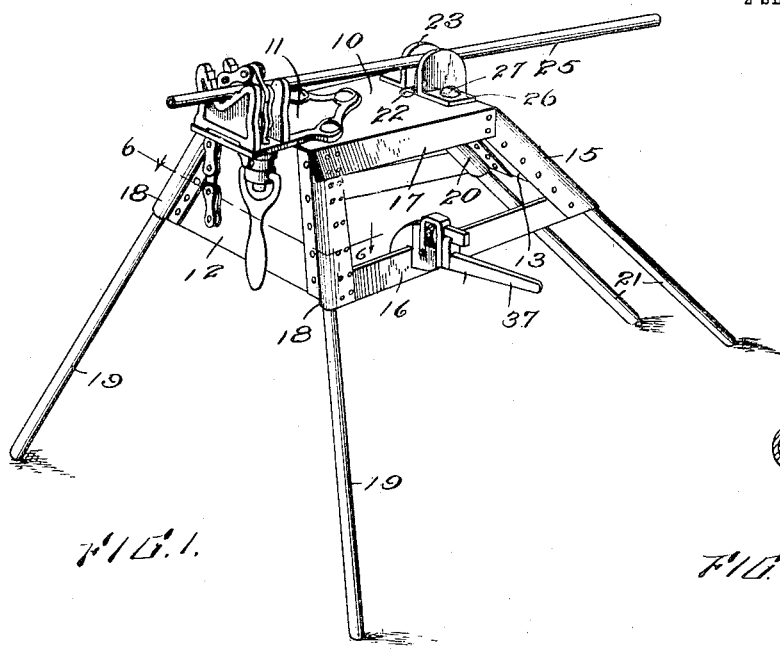
Figure 6:
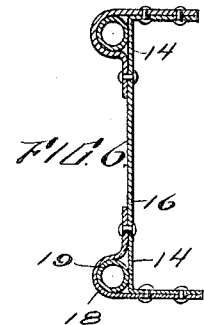
Figure 5:
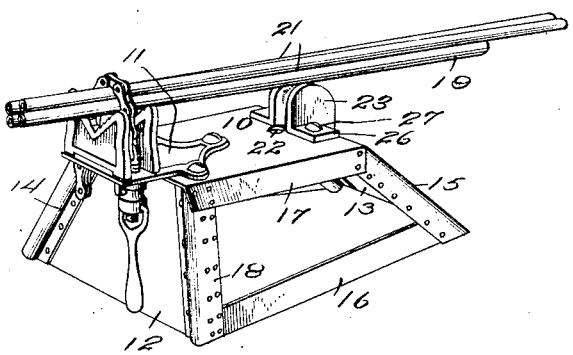
Figure 9:

In the drawings: Figure 1 is a perspective view of the stand set up in working condition showing a pipe in the vise. Fig. 2 is a view of the stand in side elevation, partly broken away. Fig. 3 is a longitudinal sectional view through the stand taken on line 3—3 of Fig. 2. Fig. 4 is a transverse sectional view taken on line 4—4 of Fig. 3. Fig. 5 is a perspective view of the stand with the legs removed and clamped upon the top of the stand for transportation and storage. Fig. 6 is a detail sectional view of the front leg sockets on the line 6—6 of Fig. 1. Fig. 7 is a detail sectional view of the rear leg sockets. Fig. 8 is a bottom plan view of an angle-iron strengthening rib employed in the stand. Fig. 9 is a view of the strengthening rib in end elevation as shown by the arrow at Fig. 8 which shows the angle formation and the relation of the wings to such angle formation. Fig. 10 is a perspective view of another strengthening rib.

Like characters of reference designate corresponding parts throughout the several views.

The improved stand which forms the subject matter of this application is provided with a top or deck 10 to which is secured a vise 11 of substantially the usual and ordinary type. The top or deck 10 is preferably made of sheet metal, as light as may be successfully used in this machine, bent downward along its edges into side flanges 17; and the rear end of the deck is bent downward into a rear end panel 13 whose sides are bent as best seen in Fig. 7 to produce rounded corners 15. A nearly upright front panel 12 is provided, extending across beneath the top and having its upper end bent forward into a horizontal flange 12' underlying the front end of the top as best seen in Fig. 4; and the side edges of this panel 12 are bent back into turned or rounded corners 14 as best seen in Fig. 6, the corners being covered by corner-plates 18 riveted to them and producing sockets for the front legs 19. Somewhat similar internal plates 20 are riveted within the other turns or corners 15, to form sockets for the rear legs 21. These legs 19 and 21 are removable from their sockets and may be transported by inserting in the vise as shown at Fig. 5 and clamping them therein whereby the entire device is reduced to compact form.

Adjacent to the rear of the deck 10 an opening 22 is provided with a mandrel 23 secured adjacent to such opening and provided with a groove as indicated particularly at Fig. 3 so that a pipe having its end inserted in the opening 22 may be bent over such mandrel 23 as indicated at 24 at Fig. 2. The groove of the mandrel 23 is also in alinement with the holding portion of the vise 11 so that a pipe as indicated at 25 in Fig. 1 held by the vise will also rest in the groove to support the pipe. The mandrel 23 is secured upon the stand in any approved manner but preferably by forming the same with outwardly extending wings 26 with bolts 27 extending through such wings and through the deck 10. A further bolt 28 is likewise preferably employed extending at an angle as shown at Fig. 4 and through the inclined rear wall 13 of the stand.

Beneath the deck is disposed a strengthening rib 29 of V-shaped cross section, bifurcated at one end as seen at 30 in Fig. 8, and the arms of bifurcation folded on oblique lines 30' and then bent outwardly into wings 31 which underlie the deck 10 and are perforated to receive the bolts 27. At this time the crotch of the bifurcation will underlie the opening 22 as seen in Fig. 4, and a pipe may be inserted downward through said opening and crotch as indicated in Fig. 2 and the same bent over the mandrel as shown by dotted lines in this view. The rib 29 is also provided with a hole 32 registering with the hole 33 in the deck as shown particularly at Fig. 4, through which extends one of the bolts securing the vise 11 upon the deck.

A further strengthening rib 34 is secured in the angle between the deck 10 and the rear wall 13 with wings 35 securing said rib to the down turned flanges 17 and provided at one side with an opening 36 through which the bolt 28 extends as shown particularly at Figs. 3 and 4.

The brace bar 16 serves not only as a brace to strengthen and reinforce the structure but also as a tool support as indicated at 37 in Fig. 1 wherein a wrench is shown supported upon such bar 16, it being understood that other tools may likewise be supported thereon as occasion and convenience may make desirable.

It will be noted especially from Figs. 1, 2 and 3 that the legs of the device are spread in all directions to prevent tipping, upsetting or misplacing of the device in operation either longitudinally or laterally relative to the pipe 25 being operated upon.

It will also be apparent from Fig. 5 that the legs 19 and 21 when desired are removed from the sockets and inserted in the vise and clamped therein, whereby the entire structure becomes compact for transportation and storage.

I claim:

1. In a stand, the combination with a top having an opening therein; of a curved mandrel fixed on the top adjacent to the opening and provided with a groove; and a vise carried by the top remote from the opening and having a pipe-receiving opening in alinement with the groove of the mandrel.

2. In a stand, the combination with a top having a pipe-opening and bolt-holes therein; of a mandrel having lateral wings for fastening bolts passing through two of said holes, the face of the mandrel being curved and having a groove leading downward to said opening, a vise secured by bolts passing through other of said bolt-holes at the opposite end of the top, with the opening through the vise in alinement with the upper portion of the groove in the mandrel, and a longitudinal strengthening rib underlying said top and engaging the lower ends of said bolts.

3. In a stand, the combination with a top having a pipe-opening and bolt-holes therein; of a curved mandrel having lateral wings adapted to be connected with said top by bolts passing through said holes, the face of the mandrel having a groove leading to said opening, and a strengthening rib underlying said top and forked at one end with the crotch of the fork alining with said opening and the fork-arms engaging the lower ends of said bolts.

4. In a stand, the combination with a top having a pipe-opening and bolt-holes therein; of a curved mandrel having lateral wings adapted to be connected with said top by bolts passing through said holes, the face of the mandrel having a groove leading to said opening, and a sheet metal strengthening rib of V-shaped cross section secured beneath said top and bifurcated at one end with the crotch of said bifurcation registering with said opening and the arms thereof folded and bent outward into wings perforated for engaging the lower ends of said bolts.

In testimony whereof I affix my signature in presence of two witnesses.

HENRY PHILLIP MARTIN.

Witnesses:
J. D. RUSSELL,
C. B. ELLIOTT.